No. 713,478. Patented Nov. 11, 1902.
O. M. MOWAT.
DRILL AND LATHE CHUCK.
(Application filed Oct. 28, 1901.)

(No Model.) 2 Sheets—Sheet 1.

WITNESSES:
J. P. Appleman
E. E. Potter

INVENTOR
O. M. Mowat.
BY
H. C. Everts
ATTORNEYS

No. 713,478. Patented Nov. 11, 1902.
O. M. MOWAT.
DRILL AND LATHE CHUCK.
(Application filed Oct. 28, 1901.)
(No Model.) 2 Sheets—Sheet 2.

UNITED STATES PATENT OFFICE.

OLIVER M. MOWAT, OF McKEESPORT, PENNSYLVANIA.

DRILL AND LATHE CHUCK.

SPECIFICATION forming part of Letters Patent No. 713,478, dated November 11, 1902.

Application filed October 28, 1901. Serial No. 80,290. (No model.)

*To all whom it may concern:*

Be it known that I, OLIVER M. MOWAT, a citizen of the United States of America, residing at McKeesport, in the county of Allegheny and State of Pennsylvania, have invented certain new and useful Improvements in Drill and Lathe Chucks, of which the following is a specification, reference being had therein to the accompanying drawings.

This invention relates to certain new and useful improvements in lathe and drill chucks, and relates particularly to that class of chucks in which a drill is held by adjustable jaws.

The invention aims to construct a drill and lathe chuck of the above-described class whereby different sizes of drills may be held and the center of the drill of whatever size held on the same line, and the invention further aims to provide means for positively driving any-sized drill within the capacity of the chuck and, further, to drive each size of drill in the firmest and most positive manner.

The invention further aims to provide adjustable jaws which have lining-up teeth not only to line up the portion of the drill which lies within the jaws, but also to line the drill at the point where it is being driven, thus insuring not only a positive driving, but a positive alinement.

With the above and other objects in view the invention further consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1:
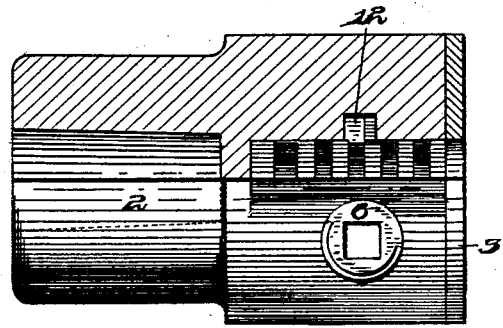
Figure 2:
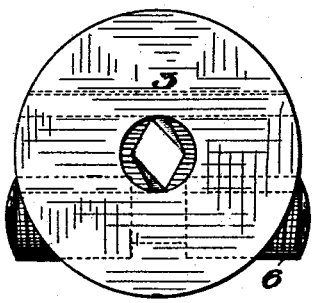
Figure 5:
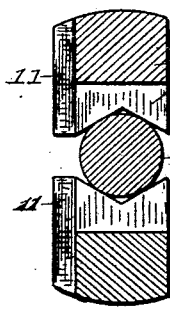
Figure 4:
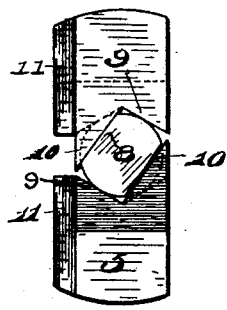
Figure 3:
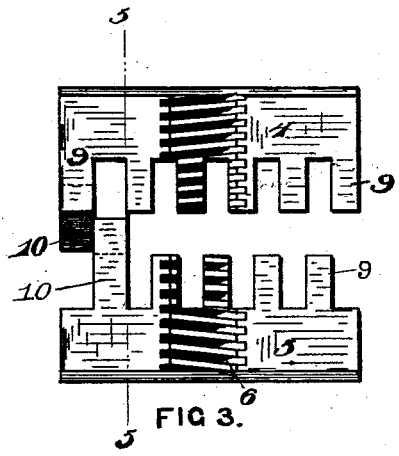
Figure 8:
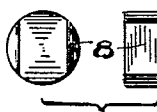
Figure 9:
Figure 7:
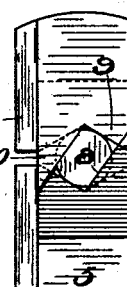
Figure 6:
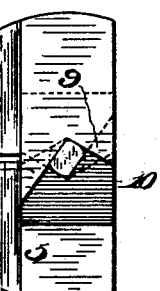
Figures 11, 12:
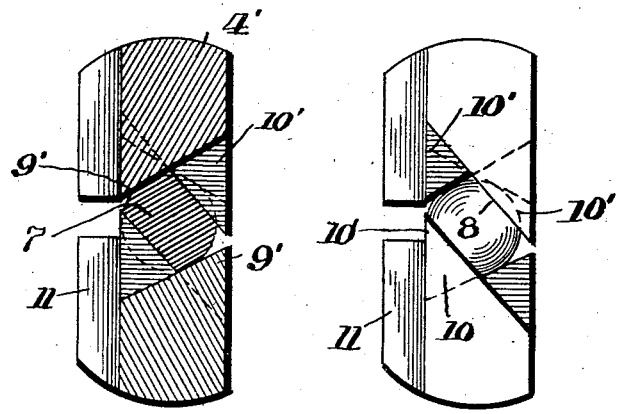
Figure 10:
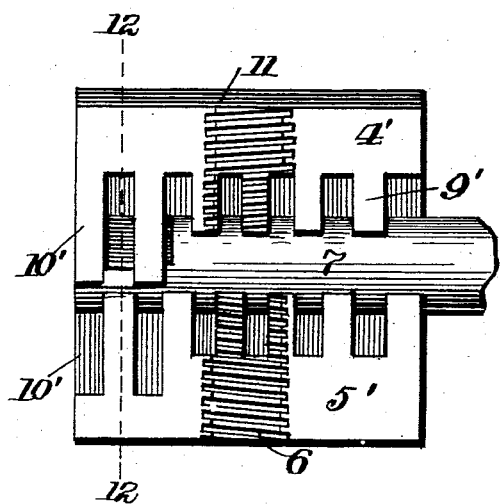

Figure 1 is a side elevation of my improved chuck, partly in longitudinal section. Fig. 2 is an end view thereof. Fig. 3 is a detail perspective view of the adjustable jaws, the operating-screw removed from the chuck. Fig. 4 is an end view of the jaws, showing the drill in position. Fig. 5 is a transverse vertical sectional view taken on the line 5 5 of Fig. 3 with the drill in position between the jaws. Figs. 6 and 7 are end views of the jaws, showing different-sized drills in position. Figs. 8 and 9 are detail views of the drill, partly broken away, showing the flattened faces formed on the drill to receive the driving-teeth of the jaws. Fig. 10 is a modified form of construction, showing the jaws in side elevation, with the drill held in position therein. Fig. 11 is an end view of the same. Fig. 12 is a transverse vertical sectional view taken on the line 12 12 of Fig. 10.

In the accompanying drawings, 1 indicates a cylindrical body of the chuck, which has a smaller cylindrical extension 2, which in practice is cored out or hollowed to afford means of adjustment to the spindle of the lathe. The body carries a face-plate 3, these parts constituting the framework of the chuck. The body 1 is channeled or bored to receive the adjustable jaws 4 5, which are placed in the channel or bore of said body portion and are adjusted toward or away from each other by means of a screw 6, threaded into the body 1, transversely thereof, and engaging threads on said jaws for this purpose. It will be understood that these jaws are adjustable laterally in the body, the screw having right and left hand threads for this purpose. These jaws 4 and 5 are adapted to hold the drill or other tool 7, and besides alining said tool within the jaws they are adapted to positively drive the tool, and this end is attained by providing flat faces 8 on the drill at opposite sides of the same at its rear end. Each jaw is provided with a series of lining-up teeth 9, and at their inner ends they carry driving-teeth 10. It will be understood (see Figs. 3 and 4) that each jaw has one of the lining-up teeth 9 on the same transverse plane with its driving-tooth 10, and the two lining-up teeth which are on a plane with the two driving-teeth engage the drill on the opposite sides thereof to that engaged by the driving-teeth, so that the drill is positively alined at the same point at which it is driven and also alined throughout the length of the jaws. Each jaw 4 and 5 is provided with a guide tongue or tenon 11, which operate in the guideways 12, formed therefor in the body portion 1.

In Figs. 10, 11, and 12 I show a modified form of construction of jaws, the chuck-body being of the same construction as that described. In this modified form of construction the jaws 4' and 5' are each provided with a series of lining-up teeth 9' and with a pair of driving-teeth 10' on each jaw. The lining-up teeth 9' of one jaw are staggered with respect to the lining-up teeth of the other jaw, and two of the lining-up teeth 9' on each jaw are staggered with the driving-teeth and with two of the lining-up teeth on the other jaw. These jaws are operated by a right and left handed screw 6 and have the guide tongues or tenons 11, as in the construction previously described. When this form of jaw is employed, the drill 7 will have flattened faces of greater area to permit the engagement therewith of a pair of driving-teeth. The two lining-up teeth which are staggered with the teeth of the opposite jaw engage the drill and line the same at opposite sides to where it is being driven in the same manner as in the preferred form of construction.

I prefer to carry out the driving feature of the invention in the manner shown, though it is evident that I may use another pair of teeth for the purpose of positively driving the drill, or I may also use only one tooth, in which case the drill would have only one flattened portion 8. The screw 6 or 6', as the case may be, is provided at one end with an opening to receive the key for operating the same in the usual manner. I desire to call attention to the fact that with this construction of jaws I not only positively drive the drill, but I aline the same, so as to positively hold in alinement at all times, and I not only aline the drill between the alining teeth of the jaws, but I line the same at the point where driven, insuring a positive alinement of the drill from end to end of the jaws and a firm holding of the same.

Having fully described my invention, what I claim as new, and desire to secure by Letters Patent, is—

1. In a drill or lathe chuck, the combination with the body, of a pair of adjustable jaws, means for operating said jaws so as to move the same laterally within the body, a series of lining-up teeth made integral with each jaw at the inner end thereof, a driving-tooth on each jaw, the driving-tooth on one jaw being staggered with respect to the driving-tooth of the other jaw, and the lining-up teeth on each jaw being in the same angular relation to the transverse movement of the jaw with the driving-tooth at a lesser angle therewith, one of the lining-up teeth of each jaw being on the same transverse plane as the driving-tooth of said jaw, the remaining lining-up teeth on one jaw being staggered with respect to the lining-up teeth of the other jaw, substantially as described.

2. In a drill or lathe chuck, the combination with the body, of a pair of adjustable jaws each having a tongue to slide in a transverse guideway provided therefor in the body, means for operating said jaws so as to move the same laterally within the body, a series of lining-up teeth made integral with each jaw with their engaging faces on the same plane, and a pair of driving-teeth of greater length than the lining-up teeth made integral with each jaw at the inner end thereof, the driving-teeth of one jaw being staggered with respect to the driving-teeth of the other jaw, two of the lining-up teeth on each jaw being on the same transverse plane as the driving-teeth of the same jaw, the remaining lining-up teeth on each jaw being staggered with the lining-up teeth of the opposite jaw, the lining-up teeth on each jaw being in the same angular relation to the transverse movement of the jaw, substantially as described.

In testimony whereof I affix my signature in the presence of two witnesses.

OLIVER M. MOWAT.

Witnesses:
JOHN NOLAND,
A. M. WILSON.